Nov. 20, 1973  R. L. BOONE  3,773,885
PROCESS FOR CURING ELASTOMER EXTRUDATES
Filed Aug. 4, 1971
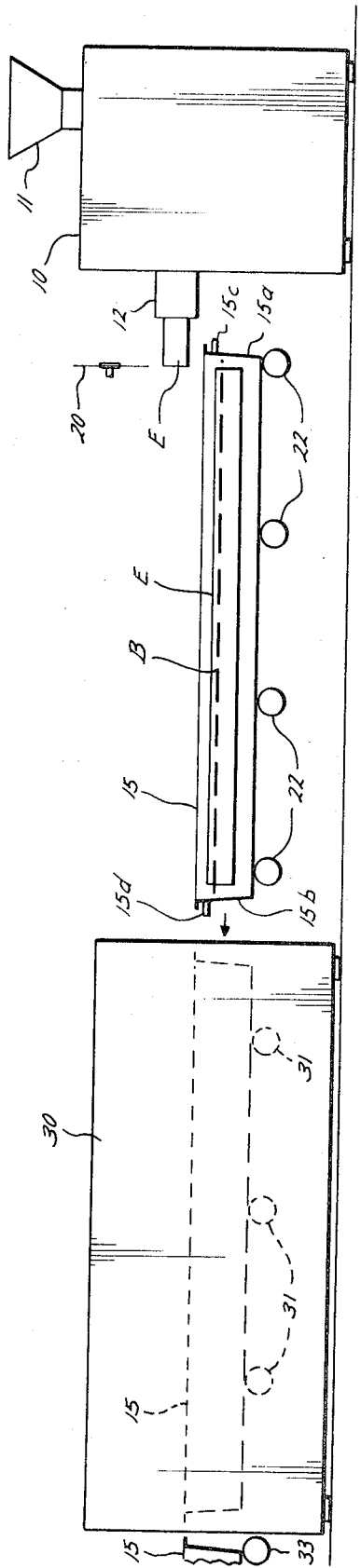
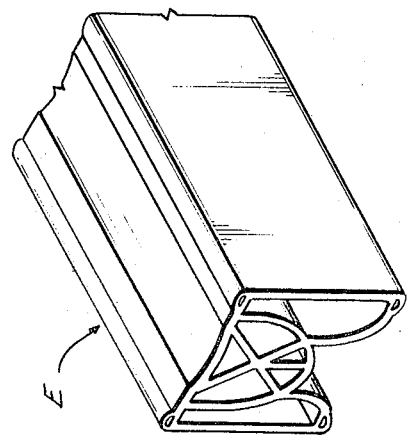
Robert L. Boone
INVENTOR
BY
Pravel, Wilson & Matthews
ATTORNEYS

3,773,885
PROCESS FOR CURING ELASTOMER EXTRUDATES

Robert L. Boone, P.O. Box 11101, Houston, Tex. 77016
Filed Aug. 4, 1971, Ser. No. 168,848
Int. Cl. B29c 25/00
U.S. Cl. 264—236   8 Claims

ABSTRACT OF THE DISCLOSURE

Process for curing elastomer extrudates, wherein an elastomer extrudate of a predetermined length is immediately cooled after extruding same in a liquid bath having a specific gravity related to the specific gravity of the extrudate so that there is a substantially zero gravity effect on the extrudate and to terminate the heat history of the extrudate prior to the application of pressure and heat thereto for curing same.

BACKGROUND OF THE INVENTION

The field of this invention is processes for curing elastomer extrudates.

In the past, many problems have been encountered in curing elastomeric extrudates, particularly extrudates having relatively complex configurations. It was proposed that a special liquid bath be used for curing the elastomer extrudates in U.S. Pat. 2,971,221. The curing of polymeric materials using a liquid bath having a specific gravity substantially equal to the polymeric material was disclosed in U.S. Pat. 3,051,992. Also, U.S. Pat. 2,774,110 disclosed putting furance resins in a liquid bath having a specific gravity closely related to the specific gravity of the extruded resin to prevent curing of it too rapidly. Although polymeric materials and resins have some features in common with elastomers, they are generally different and behave differently in curing operations, resulting in different problems and considerations as compared to elastomers.

SUMMARY OF THE INVENTION

The present invention relates to a process for curing elastomeric extrudates in predetermined lengths, wherein each length is cooled after extruding to terminate its heat history, using a liquid bath having a specific gravity related to the specific gravity of the extrudate so that there is substantially a zero gravity effect on the extrudate during such cooling, and wherein the extrudate is thereafter cured under pressure and heat while supported in such liquid bath to thereby prevent distortion thereof and to minimize porosity in the cured elastomer.

BRIEF DESCRIPTION OF THE DRAWINGS

FIG. 1 is a schematic view, in elevation, illustrating the process of this invention; and FIG. 2 is an isometric view of an elastomer extrudate having a complex configuration which may be cured using the process of its invention.

DESCRIPTION OF THE PREFERRED EMBODIMENTS

Although the process of this invention may be carried out, using various equipment, a preferred arrangement of the apparatus is schematically illustrated in FIG. 1.

Thus, in carrying out the process of this invention, a conventional rubber extruder 10 is utilized. At this point, it should be noted that the more expensive vented or vacuum extruders do not have to be employed with this invention for reasons which will be hereinafter explained. The extruder 10 has a conventional inlet 11 into which the rubber or elastomer is fed in random quantities. Usually the elastomer is introduced in strips of rubber by hand and a sufficient quantity of the rubber or elastomer is introduced through the inlet 11 so that the extruder has an adequate supply for forcing the elastomer through the die (not shown) which is located at the outlet 12. In the present illustration of the invention, the extrudate which is formed at the die in the outlet 12 has a shape indicated by the extrudate E shown in FIG. 2. When the extrudate E is discharged through the extruder dies at the outlet 12, it is hot and is relatively soft and it readily passes into a liquid bath B which is provided within a tank 15 having closed ends 15a, 15b, and also closed sides and bottom. The upper end of the tank 15 is open, at least in part, to receive the extrudate E, although the tank 15 may be covered after the extrudate E is positioned therein. In fact, a cover is beneficial to reduce condensation of the steam used during the curing of the elastomer in an autoclave, as will be more evident hereinafter. In FIG. 1, an extrudate of a predetermined length which is adapted to fit within the tank 15 is illustrated as already within the liquid bath B, while the next extrudate E is being extruded. The extrudate E which is within the tank 15 has been cut from the portion of the extrudate E which is extending from the outlet end 12 of the extruder 10 by a knife or cutting blade 20, which is illustrated in FIG. 1 as a rotary blade which is lowered for cutting purposes and is raised when not in use for cutting.

The level of the liquid bath B is indicated by a dash line as being slightly below the upper surface of the extrudate E, although in practice, the liquid level of the bath B is approximately the same as the upper surface of the extrudate E since the specific gravity of the liquid in the liquid bath B is usually equal to, or approximately equal to, the specific gravity of the extrudate. Under such conditions, there is a zero gravity effect upon the extrudate since it is neither forced upwardly or downwardly. There may be times when it is desirable to have a slight upward or floating effect on the extrudate E, in which case the extrudate E would project slightly above the upper surface of the liquid bath B as illustrated in FIG. 1.

Under normal circumstances, the predetermined length of the extrudate E is approximately the same as the length of the tank 15. The width of such tank 15 may be approximately the same width as the width of the extrudate E but if several lengths of the extrudate E are disposed side by side in the tank 15, the width of the tank 15 may be wider for such purpose. The extrudate E does not touch the bottom of the tank 15 so that it does not become distorted by resting upon any solid surface while it is in the tank 15.

The tank 15 may be supported upon any type of support such as rollers 22 which are illustrated in FIG. 1. A plurality of tanks 15 may be utilized in the process of this invention, in side-by-side position on the rollers 22 so that a tank 15 will be available for each length of the extrudate E which is extruded from the extruder 10, even though there is some retention time for each extrudate length in each of the tanks 15.

Preferably, the liquid bath is a brine solution which has its pH adjusted to the pH of the rubber which is normally neutral to slightly basic. For example, the brine solution may be a calcium chloride solution or a sodium chloride solution. Other aqueous solutions may also be employed, for example, aguagel solutions, bentonite solutions, and similar solutions which are not deleterious with respect to rubber or other elastomers. It should be pointed out that this invention is directed to the curing of elastomer extrudates which include natural rubber and synthetic rubbers. By way of example, the synthetic rubbers may be neoprene, nitrile butadiene rubber, styrene butadiene rubber, polyisobutylene rubber, polyisoprene rubber, and polybutadiene rubber. The term "elastomers"

as used herein encompasses all of such synthetic rubbers as well as natural rubber and any other synthetic rubbers which are generally of the same properties.

The liquid bath B is provided for the purpose of cooling the extrudate E that is disposed therein so as to terminate the heat history of such extrudate and to restore the normally higher "green" or uncured strength of the extrudate to prevent precuring and distortion of the extrudate E. To facilitate such cooling, the liquid in the bath B may be circulated by introducing the liquid into the tank 15 through an inlet pipe 15c at the end 15a and by taking the liquid out of the tank 15 at the outlet opening 15d at the end 15b. Suitable hoses and a pump and circulating tank (not shown) may be connected to the inlet pipe 15c and the outlet pipe 15d in any suitable manner for circulating the liquid in the tank 15 so as to maintain the level of the liquid bath B as desired and to also provide a cooling effect by reason of such circulation. Such circulation of the liquid in the bath B also prevents the development of localized hot areas in the liquid bath B.

The tank 15 with the liquid bath B and the length of the elastomer extrudate E therein is moved, after the extrudate E has been cooled enough to terminate its heat history, to an autoclave 30 which is schematically illustrated in FIG. 1. The autoclave 30 is merely illustrative of any place wherein heat and pressure may be applied for the purpose of curing the elastomer extrudate E. The autoclave 30 may have suitable rollers 31 disposed therein which receive the tank 15 in the position shown in dotted lines in FIG. 1. The pressure and heat may be provided in the autoclave 30 in any conventional manner, such as by injecting steam into the closed housing of the autoclave 30. It would be appreciated that the heat and the pressure may be applied by any other suitable means in carrying out the process of this invention. While the heat and pressure are applied, the length of the elastomer E which is in the tank 15 within the autoclave 30 is supported in the liquid bath B so that there is the zero gravity effect to thereby prevent distortion of the extrudate E while it is being cured. Because of the use of the pressure during the curing, which is very important with respect to the curing of an elastomer, the rubber or elastomer is properly cured without porosity. The cooling of the extrudate in the liquid bath B prior to the applying of the heat and pressure in the autoclave 30 also assures that there will not be any premature curing or precuring of the extrudate prior to the application of the pressure and heat. This again is for the purpose of avoiding porosity of the rubber. This also is a feature which makes it possible to use the extruder 10 of conventional construction rather than one which is more expensive and is of the vented or vacuum type.

It should be noted that the preferred brine solution which is used for the liquid bath B has a boiling point at atmospheric pressure which is less than the curing temperature necessary to cure the elastomer extrudate which assures that there will not be any precuring of the extrudate E in the liquid bath prior to the application of the heat and pressure.

After the curing of the extrudate E within the autoclave 30, the tank 15 is rolled or is otherwise moved out of the autoclave 30, preferably upon additional rollers 33 at the outlet end of the autoclave 30.

Although the present invention is illustrated in FIG. 1, with the extrudate E disposed horizontally, it is possible to conduct the method of this invention under certain conditions with the extrudate E disposed vertically. Under those circumstances, the extrudate E would be lowered into a tank or cylinder having the general appearance of a well and in which the liquid bath B is disposed. The liquid bath B would have the same specific gravity as the specific gravity of the extrudate E, and there would be an initial cooling by the liquid bath, followed by the application of heat and pressure at a point below the initial cooling phase. The pressure would be applied to the extrudate E by reason of the depth of the liquid bath as the extrudate E is lowered.

It will be appreciated that other variations in the process which have been described herein may be made by those skilled in the art.

The foregoing disclosure and description of the invention are illustrative and explanatory thereof, and various changes in the size, shape, and materials as well as in the details of the illustrated construction may be made without departing from the spirit of the invention.

I claim:

1. A process for curing elastomer extrudates, comprising the steps of:
    suspending an elastomer extrudate of a predetermined length in a liquid bath in a container as it is extruded, wherein the length of the extrudate is shorter than the length of said container and the liquid bath has a specific gravity substantially the same as that of the extrudate and the elastomer extrudate is supported by the buoyancy of the liquid only without touching the bottom of the container or any other solid support;
    cooling said extrudate in said liquid bath after it is extruded and prior to curing said extrudate to terminate the heat history thereof and to restore the higher green strength of the elastomer; and
    thereafter subjecting the extrudate to heat and pressure conditions while still suspended in said liquid bath for curing said extrudate while it is suspended with substantially a zero gravity effect thereon.

2. The process set forth in claim 1, wherein: said liquid bath is provided by a liquid confined in a tank in which the extrudate is disposed.

3. The method set forth in claim 2, wherein: said tank is disposed in an autoclave for subjecting the extrudate to said heat and pressure while also suspending same with substantially no gravity effect thereon.

4. The process set forth in claim 1, wherein: said liquid bath is provided by an aqueous brine solution having a boiling point at atmospheric pressure which is less than the temperature necessary to cure the elastomeric extrudate.

5. The method set forth in claim 1, wherein: the elastomer of which the extrudate is formed is selected from the group consisting of natural rubber and synthetic rubbers.

6. The method set forth in claim 1, wherein: the elastomer extrudate has a complex configuration which would be subject to distortion if it were not suspended in said liquid bath after extrusion.

7. The method set forth in claim 1, wherein: said extrudate is disposed substantially horizontally when in said liquid bath.

8. The method set forth in claim 1, wherein:
    said liquid bath is disposed in a substantially vertical well into which said extrudate is fed; and
    said heat and pressure are provided by the depth of the liquid bath into which the extrudate is lowered.

References Cited
UNITED STATES PATENTS

| | | | |
|---|---|---|---|
| 2,463,288 | 3/1949 | Leguillon | 264—347 |
| 2,125,001 | 7/1938 | Cowen et al. | 264—150 |
| 3,517,097 | 6/1970 | Mixell et al. | 264—347 |
| 3,051,992 | 9/1962 | Bradley | 264—347 |
| 1,740,029 | 12/1929 | Moomy | 264—348 |
| 2,682,082 | 6/1954 | Gehman et al. | 264—347 |
| 3,553,303 | 1/1971 | Zavasnik | 264—237 |

ROBERT F. WHITE, Primary Examiner

G. AUVILLE, Assistant Examiner

U.S. Cl. X.R.

264—178 R, 237